US007681174B2

(12) United States Patent
Chuang et al.

(10) Patent No.: US 7,681,174 B2
(45) Date of Patent: Mar. 16, 2010

(54) COMPUTER SYSTEM AND RELATED METHOD FOR GENERATING PROGRAM CODES DESCRIBING RELATIONSHIPS OF NUMEROUS FUNCTION NAMES AND NUMEROUS CONTROL CODES OF A DEVICE

(75) Inventors: Willy Chuang, Taipei Hsien (TW); Jakie Yeh, Taipei Hsien (TW); Shangen Wang, Taipei Hsien (TW); Jonathan Lin, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 1483 days.

(21) Appl. No.: 10/905,223

(22) Filed: Dec. 22, 2004

(65) Prior Publication Data
US 2005/0273760 A1 Dec. 8, 2005

(30) Foreign Application Priority Data
Jun. 8, 2004 (TW) .............................. 93116425 A

(51) Int. Cl.
*G06F 9/44* (2006.01)
(52) U.S. Cl. ...................................................... 717/106
(58) Field of Classification Search ................. 717/106, 717/109
See application file for complete search history.

(56) References Cited

U.S. PATENT DOCUMENTS

| 6,160,491 A * | 12/2000 | Kitao et al. ............ 340/825.69 |
| 2005/0005288 A1* | 1/2005 | Novak .......................... 725/32 |
| 2007/0016889 A1* | 1/2007 | Miyazaki ...................... 717/106 |

\* cited by examiner

*Primary Examiner*—Philip Wang
(74) *Attorney, Agent, or Firm*—Winston Hsu

(57) ABSTRACT

A method for generating program code used to describe relationships between a plurality of function names and a plurality of control codes of a device. The method comprises receiving the relationships between the plurality of function names and the plurality of control codes, detecting if one of the function names corresponds to more than one control code and if one of the control codes corresponds to a plurality of function names. Program code is generated to describe the relationships if there are no multiple mappings between the control codes and the function names. A warning message is generated if there is function name corresponding to more than one control code or a control code corresponds to more than one function name.

16 Claims, 5 Drawing Sheets

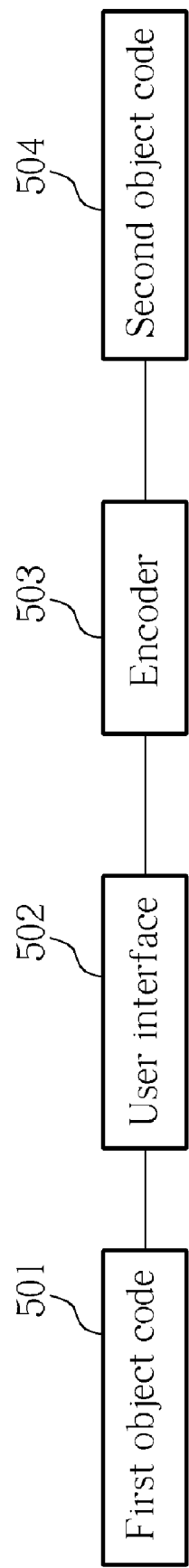

COMPUTER SYSTEM AND RELATED METHOD FOR GENERATING PROGRAM CODES DESCRIBING RELATIONSHIPS OF NUMEROUS FUNCTION NAMES AND NUMEROUS CONTROL CODES OF A DEVICE

BACKGROUND OF INVENTION

1. Field of the Invention

The present invention relates to a method for simplifying the procedure of product development, and more particularly a method for simplifying the procedure of product development used to generating a program code for describing the relationship between a plurality of function names and a plurality of control codes.

2. Description of the Prior Art

It is a popular technique to use a remote controller to govern home and other electrical equipment. Please refer to FIG. 1, which is a schematic diagram of a typical system 100 having an electrical device 110 and a remote controller 120. The electrical device 110 may be a digital versatile disc player (DVD), which has firmware 116 for operating predetermined functions and storing the driver programs of the electrical device 110. The remote controller 120 corresponding to the electrical device 110 has several functional keys, such as a play button 122 and a stop button 124 shown in FIG. 1. When user press the play button 122, the remote controller 120 transmits a corresponding control code and the firmware 116 looks for the function name corresponding to the control code. When the electrical device 110 receives the control code and the firmware 116 finds out that the corresponding function name of the control code is "play", the firmware 116 executes the play function.

However, there are many functions provided by the remote controller and no standard for normalizing the relationships between the control codes of each buttons and those functions. First, the factories have to define the relationships between the control codes and functions by themselves when starting to develop remotely controlled devices, then design the program code for describing the relationships between the control codes and functions, and finally write the program code into the firmware of the electrical device. When writing the program code for describing the relationships between the function names of the device and the control codes sent by the remote controller, the programmer has to catch on the functions of the device and avoid defining an unavailable function in the program code. However, inadvertent mistakes usually occur when defining the mapping of each control code to the related function name, such as a single control code maps to numerous function names, or a single function name maps to numerous control codes. The cost of time for debugging increases with the complexity of the program code for describing the relationships between the function names and the control codes.

More particularly, consider a situation where an electrical device A, such as a video control chip, is developed by manufacturer X, and an electrical device B, such as a TV comprising the electrical device A, is developed by manufacturer Y. Manufacturer Y has to catch the relationships between the control codes of the electrical device B and the function names of the electrical device A and understand the firmware of the electrical device A first, then edit and compile the firmware of the electrical device B to generate firmware for operating the electrical device B. The way is quite complex and inefficient when manufacturer X and manufacturer Y tend to modify the connections of the electrical device A and the electrical device B. That is a bottleneck in product development.

SUMMARY OF INVENTION

The claimed invention provides a method for detecting if there is an overlapping relationship between function names and control codes, and more particularly to provide a computer system and a related method for generating program code describing the relationships between a plurality of function names and a plurality of control codes.

The claimed invention discloses a method for generating program code used to describe relationships between a plurality of function names of a device and a plurality of control codes. The method comprises receiving the relationships between the plurality of function names of the device and the plurality of control codes. If at least one of the plurality of function names corresponds to more than one of the plurality of control codes, a warning message is outputted. If at least one of the plurality of control codes corresponds to more than one of the plurality of function names of the device, a warning message is outputted. If no warning messages occur, the code is generated according to the relationship.

The claimed invention also discloses a computer system for generating a code used to describe relationships between a plurality of function names of a device and a plurality of control codes. The computer system comprises a relating unit, a first detecting unit, a second detecting unit, a first message unit, a second message unit, and a processing unit. The relating unit relates the plurality of function names to the plurality of control codes. The first detecting unit detects if one of the plurality of function names corresponds to more than one control codes. The second detecting unit detects if one of the plurality of control codes corresponds to more than one function names. The first message unit is for generating a warning message when the detecting results of the first detecting unit and the second detecting unit show that one of the plurality of function names corresponds to more than one control codes. The second message unit is for generating a duplicated function name error message when the detecting results of the first detecting unit and the second detecting unit show that one of the plurality of control codes corresponds to more than one function names. The processing unit is for generating program code describing the relationships if none of the function names correspond to more than one control codes or if the function name corresponds to more than one control codes but is considered allowable, and none of the plurality of control codes corresponds to more than one function names.

These and other details of the present invention will no doubt become obvious to those of ordinary skill in the art after reading the following detailed description of the preferred embodiment that is illustrated in the various figures and drawings.

BRIEF DESCRIPTION OF DRAWINGS

FIG. 5 is a schematic diagram of a product developing system according to the present invention.

DETAILED DESCRIPTION

The kernel feature of the present invention is when generating program code which is used to describe the relationships between a plurality of function names and a plurality of control codes, the method of the present invention is able to detect if these function names and control codes have an error-overlapping relationship or an inappropriate-overlapping relationship. Another kernel feature of the present invention is that the relationships between a plurality of function names of a certain device and a plurality of control codes of a remote controller can be modified directly through a simple interface, instead of modifying the relationships by writing program code.

Figure 1:
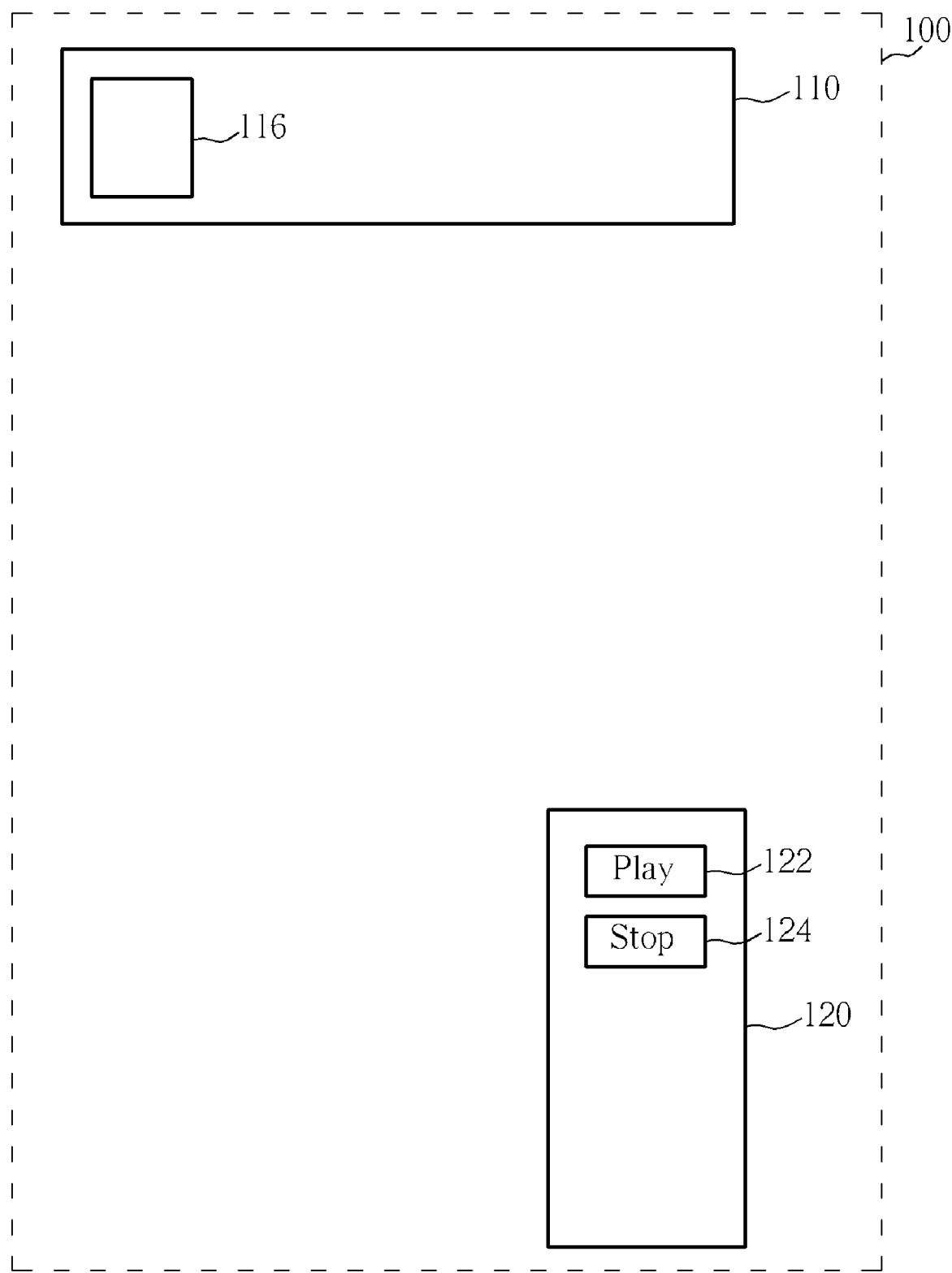
FIG. 1 is a schematic diagram of a prior art electrical device and the remote controller.
Figure 2:
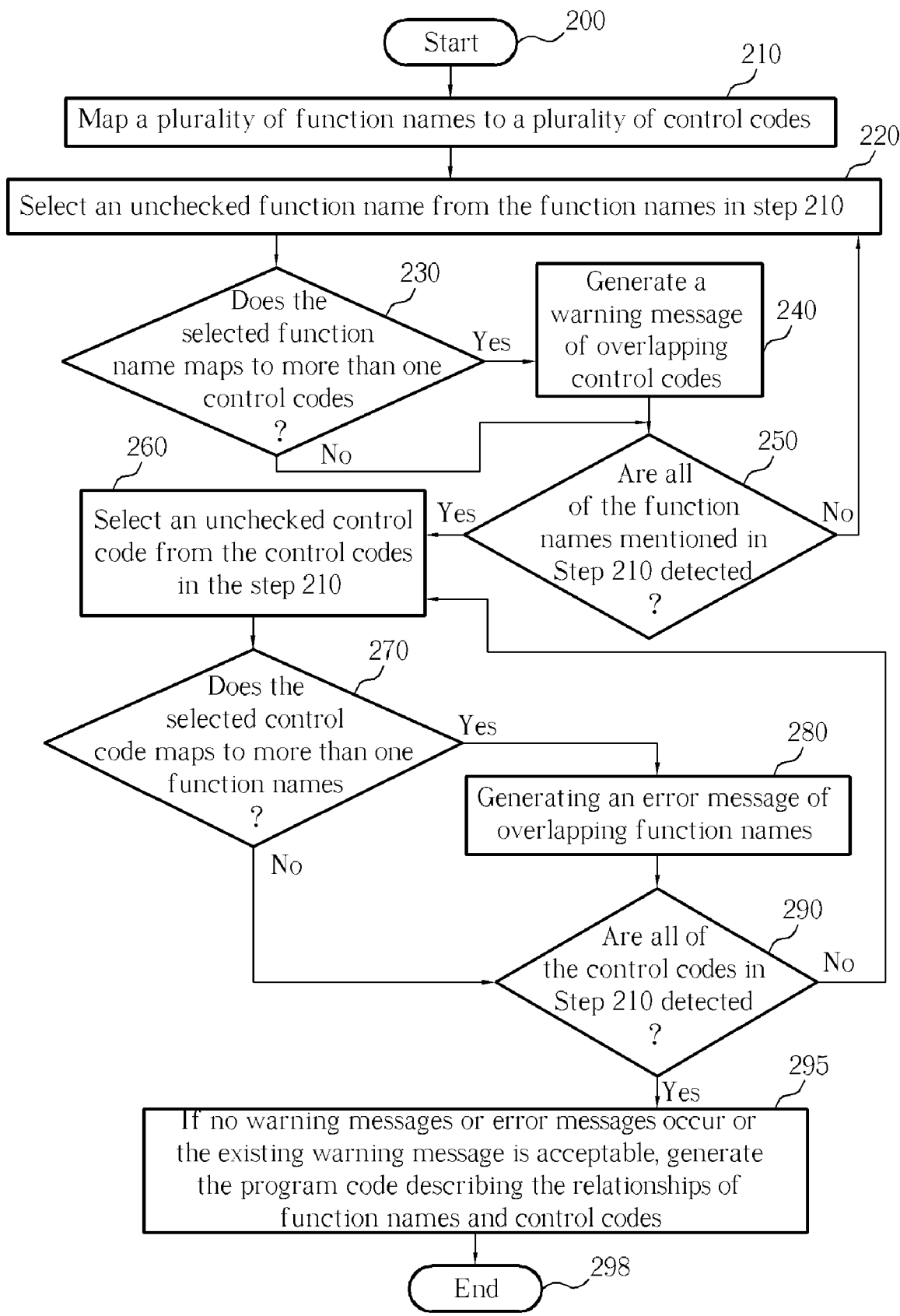
FIG. 2 is flow chart of the method for generating program code describing the relationships between a plurality of function names and a plurality of control codes according to the present invention.

Please refer to FIG. 2, which is a flow chart for generating the program code for describing the relationships between a plurality of function names and a plurality of control codes according to a preferred embodiment of the present invention.

Step 200: Start.

Step 210: Receive the relationships between the plurality of function names and the plurality of control codes.

Step 220: Select an unchecked function name from the plurality of function names mentioned in Step 210.

Step 230: If the selected function name maps to more than one control codes, go to Step 240. Otherwise, go to Step 250.

Step 240: Generate a warning message of overlapping control codes.

Step 250: If all of the function names mentioned in Step 210 have been detected, go to Step 260. Otherwise, go to Step 220.

Step 260: Select an unchecked control code from the plurality of control codes mentioned in Step 210.

Step 270: If the selected control code maps to more than one function names, go to Step 280. Otherwise, go to step 290.

Step 280: Generate an error message of overlapping function names.

Step 290: If all of the control codes mentioned in Step 210 have been detected, go to Step 295. Otherwise, go to Step 260.

Step 295: If no warning message and no error message occur or the existing warning message is acceptable to the programmer (i.e., the product designer), generate the program code for describing the relationships mentioned in Step 210.

Step 298: End.

Another preferred embodiment of the present invention provides a computer system used to generating program code for describing the relationships between a plurality of function names of a device and a plurality of control codes. FIG. 2 is the operational flow chart of the computer system, and FIG. 3 is the schematic diagram of the computer system.

As shown in FIG. 2, when the computer system receives the relationships of the plurality of function names of the device and the plurality of control codes defined by the programmer, the computer system starts to detect if each of the function names maps to only one control code, and detect if each of the control codes maps to only one function name. According to the present invention, the method can also be designed to detect real-time if overlapping relationships occur when the programmer is entering a relationship of a single function name and a control code, and output an error message (or a warning message) immediately, if overlapping relation occurs.

Figure 3:
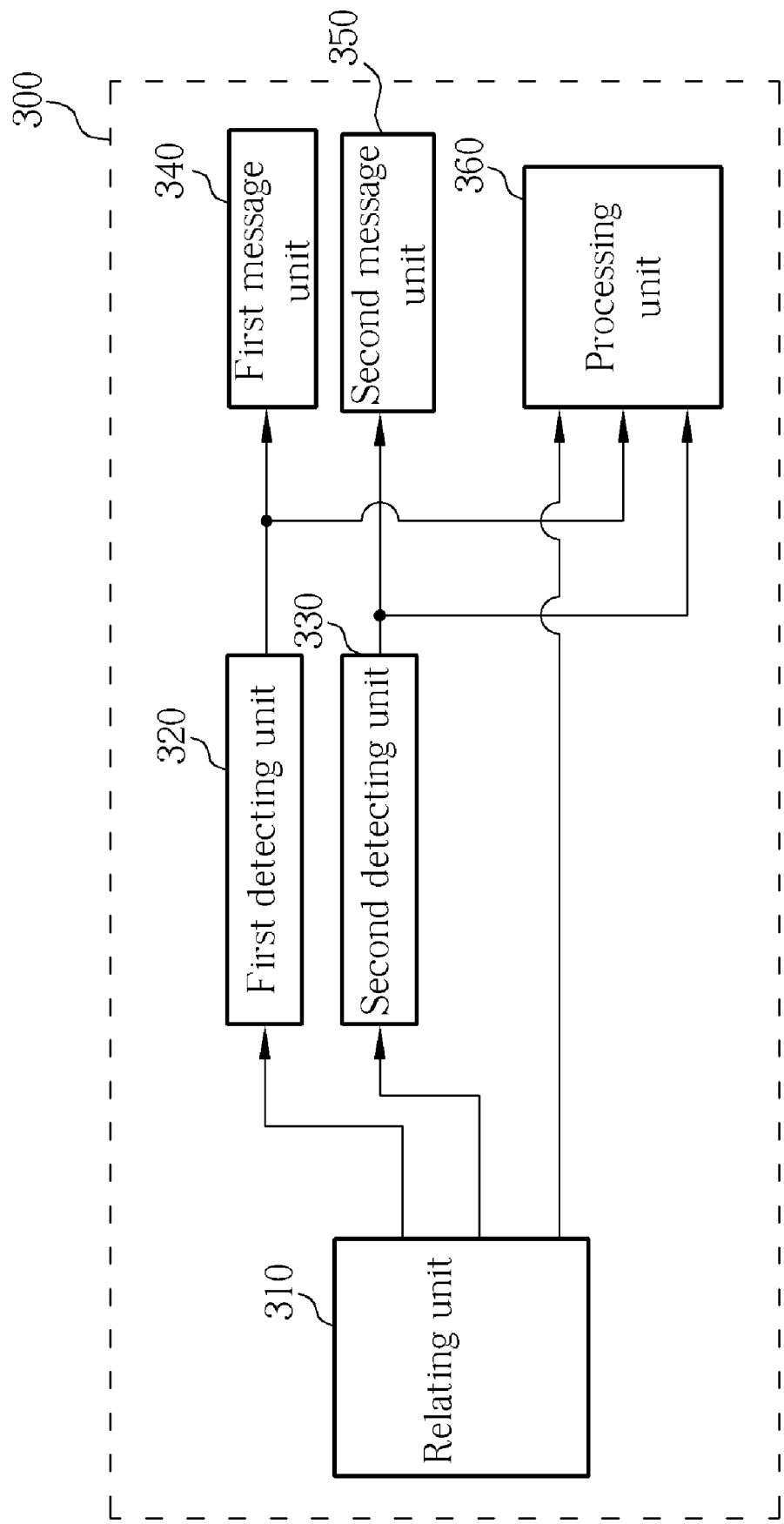
FIG. 3 is a schematic diagram of a computer system according to the present invention.

FIG. 3 is a schematic diagram of the computer system 300 of a preferred embodiment. As show in FIG. 3, the computer system 300 comprises a relating unit 310, a first detecting unit 320, a second detecting unit 330, a first message unit 340, a second message unit 350, and a processing unit 360. The relating unit 310 is utilized to relate a plurality of function names of the device to a plurality of control codes. The first detecting unit 320 detects if one of the plurality of function names maps to more than one control code. The second detecting unit 330 detects if one of the plurality of control codes maps to more than one function name. The first message unit 340 is for outputting a warning message when the detecting results of the first detecting unit 320 show that a function name maps to more than one control codes. The second message unit 350 is for outputting an error message when the detecting results of the second detecting unit 330 show that a control code maps to more than one function names. The processing unit 360 generates a program code for describing the relationships if none of the function names respectively map to more than one control code or the multiple mapping is allowable, and if none of the control codes respectively map to more than one function name. Please note that the relating unit 310, the first and second detecting units 320, 330, the first and second message units 340, 350, and the processing unit 360 are functional blocks, which can be implemented by hardware, software, or firmware.

Another embodiment of the present invention can also comprise the following modifications: The computer system prints a list of the plurality of function names provided by the device to be selected; or the computer system prints a list of the plurality of control codes of the device to be selected; or detecting if the function names used by the programmer are correct or not according to the plurality of function names of the device, and detecting if the control codes are correct or not according to the format of the control codes of the remote controller. For example, when the programmer maps a control code to a non-existing function name, the computer system shows a control code error message. Alternatively or in addition, when the programmer maps a function name to a wrong control code, the computer system shows the programmer a function name error message.

Furthermore, the present invention provides a user interface and a compiler (a rule for converting the input message via user interface into object code is embedded inside), and presents all the necessary functions for mapping the function names and control codes in the user interface. Another preferred embodiment is capable of presenting all of the function names and control codes in the user interface to allow the programmer to define the relationships via the user interface. Then, object code is generated through the compiler instead of generating the object code from a source code written by the programmer. As a result, it is not necessary for the programmers to be skilled in programming and write source code for describing the relationships by themselves.

For example, when a manufacturer produces a DVD player, the manufacturer has to generate object code for describing relationships between the plurality of function names and plurality of control codes. Therefore, the firmware designer (or control chip designer) of the DVD player provides the manufacturer with a user interface and an encoder according to the functions provided by the firmware and a template object code. Then the manufacturer can define the relationship between each function name and control code easily through the user interface and transfer the relationship to memory having the object code of the DVD player, such as a hard-disk, through the encoder instead of writing any program code manually. From now on, the manufacturer is capable of modifying the firmware of DVD player through the user interface, instead of contacting the vendor to exchange program code.

Figure 4:
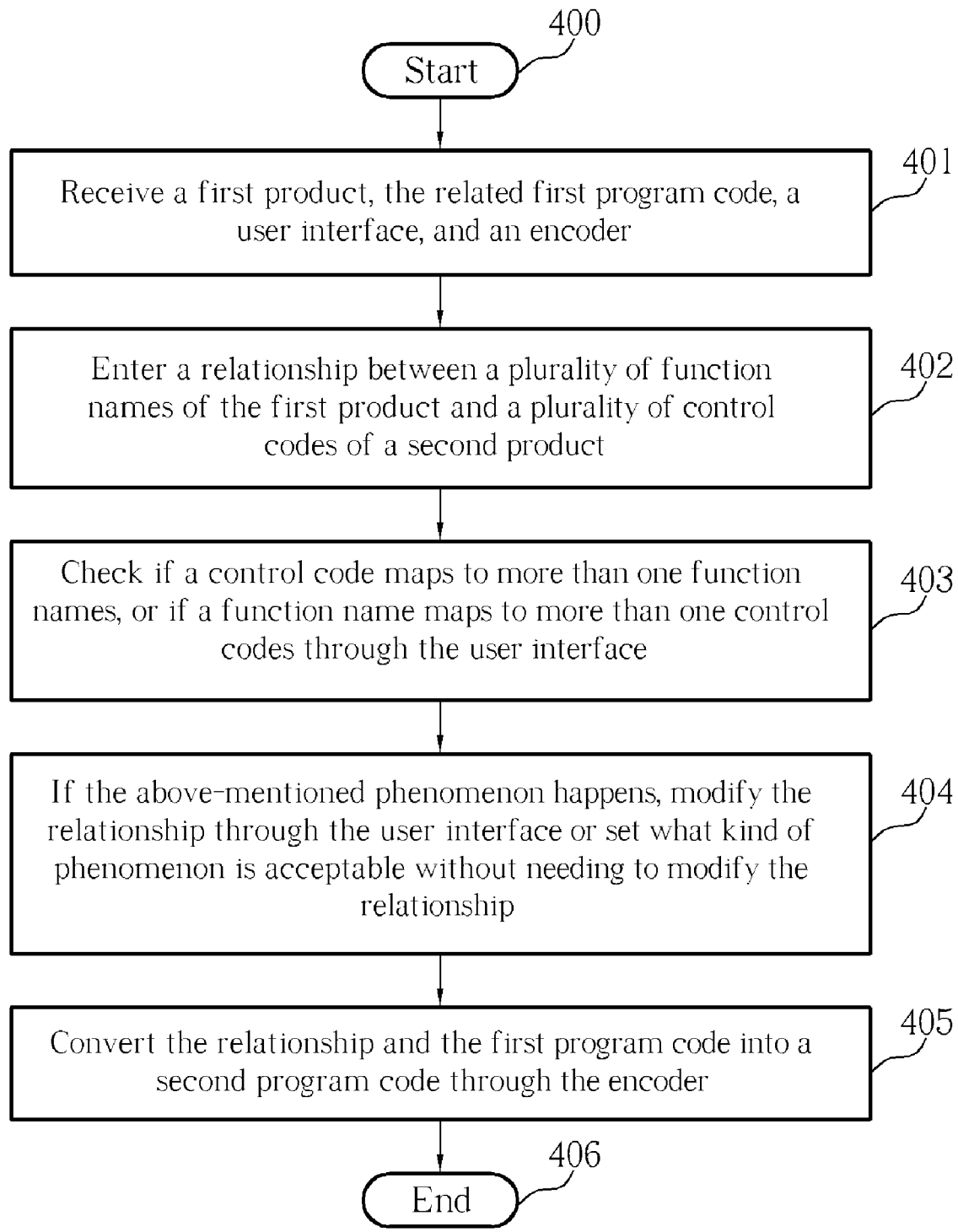
FIG. 4 is a flow chart of a product development procedure according to the present invention.

Please refer to FIG. 4, which is a flow chart of a product development procedure according to another preferred embodiment of the present invention. The procedure comprises:

Step 400: Start.

Step 401: Receive a first product, the related first program code, a user interface, and an encoder.

Step 402: Enter relationships between a plurality of function names of the first product and a plurality of control codes of a second product.

Step 403: Check if a control code maps to more than one function name, or if a function name maps to more than one control code through the user interface.

Step 404: If the phenomenon checked in step 403 happens, change the relationship through the user interface or set what kind of phenomenon is acceptable without needing to modify the relationship.

Step 405: Convert the relationships and the first program code into a second program code through the encoder.

Step 406: End.

The steps 402-404 predominately use the method of generating program code for describing relationships between a plurality of function names of a device and a plurality of control codes of the previous embodiments. The kernel difference is this embodiment describes the procedure as a user who utilizes the method and the above-mentioned embodiments describe the method according to the operation of the apparatus.

Please refer to FIG. 5, which is a product developing system according to the above-mentioned method. As shown in FIG. 5, the system comprises at least a user interface 502 and an encoder 503 for modifying a first object code 501 of the first product and generating a second object code 504 of the second product. The user interface 502 is used for receiving the function names of the first product and the relationships between the function names and the control codes of the second product. The user interface 502 can also check if a control code maps to more than one function name or if a function name maps to more than one control code. When the above-mentioned phenomenon occurs, the user interface send a warning message or an error message to the user and allows the user to modify the relationship through the user interface accordingly or to determine that the phenomenon is acceptable without needing to modify the relationship. In addition, the encoder 503 is used to convert the first object code 501 and the relationship modified through the user interface 502 into a second object code 504. In the preferred embodiment, the user interface 502 and encoder 503 are just functional blocks, which can be implemented by a specific program, or a window controlled by a program. The user interface 502 also can be a file format such as word file or PDF file, which can be modified by common users in place of an indirect edited file as a binary code.

Obviously, the user interface 502 and encoder 503 correspond to the computer system for generating program code for describing the relationships between the plurality of function names and plurality of control codes. The kernel feature of the present embodiment is describing the operation steps of the users, but the previous embodiment's kernel feature is describing the inner operation of the system.

In summary, the present invention provides a computer system to generate program code describing the relationships of a plurality of function names and a plurality of control codes, and to check if the relationships overlap when producing the program code, so as to simplify the process of generating a object code and reducing the errors. The user interface of the present invention attains those debugging functions mentioned in the above embodiments, and allows utilization by users not familiar with programming to simplify the process of product development, such as avoiding the difficulties related in the trivial discussion of the DVD player manufacturer and the firmware engineer.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of generating program code for generating firmware of a device, the firmware describing relationships between a plurality of function names of the device and a plurality of control codes, the control codes receivable by the device from a second device for commanding the device to execute a corresponding function of the device, the method comprising:

a computer system programmed for receiving the relationships between the plurality of function names of the device and the plurality of control codes;

if at least one of the plurality of function names maps to more than one of the plurality of control codes, the computer system programmed for outputting a warning message;

if at least one of the plurality of control codes maps to more than one function name of the device, the computer system programmed for outputting an error message; and according to the details of the warning message, and only if no error message is outputted, the computer system programmed for generating the program code according to the relationships.

2. The method of claim 1 wherein the program code for describing the relationships is generated only when no warning messages occur.

3. The method of claim 1 further comprising generating the program code for describing the relationships when an existing outputted warning message is an acceptable warning message.

4. The method of claim 1 wherein the step of receiving the relationships comprises outputting a function name error message if at least one of the plurality of function names is wrong.

5. The method of claim 1 wherein the step of receiving the relationships comprises outputting a control code error message if at least one of the plurality of control codes is wrong.

6. The method of claim 1 further comprising at least one of the following steps:

providing a plurality of function names relating to the device and receiving a relationship generated according to the plurality of function names; and providing a plurality of control codes relating to the device and receiving a relationship generated according to the plurality of control codes.

7. The method of claim 1 further comprising providing a user interface, wherein the user interface performs at least one of the following functions:

listing the plurality of function names relating to the device;

listing the plurality of control codes relating to the device; and receiving the relationships.

8. A computer system for generating program code for generating firmware of a device, the program code describing relationships between a plurality of function names of the device and a plurality of control codes, the control codes receivable by the device from a second device for commanding the device to execute a plurality of functions of the device named by the plurality of function names, the computer system comprising:

a memory;

a processor programmed for storing the plurality of function names and the plurality of control codes into the memory;

a relating unit accessing the memory for mapping the plurality of function names to the plurality of control codes;

a first detecting unit accessing the memory for detecting if one of the plurality of function names corresponds to more than one control code of the plurality of control codes;

a second detecting unit accessing the memory for detecting if one of the plurality of control codes corresponds to more than one function name of the plurality of function names;

a first message unit for generating a warning message when the first detecting unit detects one of the plurality of function names corresponds to more than one control code of the plurality of control codes;

a second message unit for generating a duplicated function name error message when the second detecting unit detects one of the plurality of control codes corresponds to more than one function name of the plurality of function names; and a processing unit for generating the program code describing the relationships only when no unallowable warning message is generated by the first message unit and no error message is generated by the second message unit, and storing the program code into the memory.

9. The computer system of claim 8 wherein each unit of the computer system can be implemented by hardware, software, or firmware, which can achieve the desired function of the unit.

10. The computer system of claim 8 wherein the relating unit lists the function names of the device for a user of the computer system.

11. The computer system of claim 8 wherein the relating unit further lists the corresponding control codes of the device for a user of the computer system.

12. The computer system of claim 8 wherein after the warning message is generated, the relating unit is used to determine that the warning message, which means a function name corresponds to more than one control code, is acceptable or not.

13. The computer system of claim 8 wherein after the warning message is generated, the relating unit determines that a phenomenon shown in the warning message is acceptable or not according to specifications of the device.

14. A procedure of product development by using a computer system having a processor and memory, the procedure comprising:

receiving a first product, first program code corresponding to the first product, a user interface, and an encoder;

inputting into the memory a plurality of function names of the first product corresponding to functions of the first product executable by the first product through the user interface and relationships between a plurality of control codes of a second product and the plurality of function names of the first product, the plurality of control codes receivable by the first product for commanding the first product to execute the functions named by the plurality of function names;

the processor detecting if a control code of the plurality of control codes corresponds to more than one function name of the plurality of function names, or if a function name of the plurality of function names corresponds to more than one control code of the plurality of control codes;

when detected that a control code of the plurality of control codes corresponds to more than one function name of the plurality of function names, or if a function name of the plurality of function names corresponds to more than one control code of the plurality of control codes, changing the relationship or determining that current relationship is acceptable through the user interface; and utilizing the encoder to convert the relationships processed by the user interface and the first program code into second program code for the second product, the processor storing the second program code into the memory.

15. The procedure of product development of claim 14 wherein the first program code is firmware for driving the first product and the second program code is firmware for driving the second product.

16. The procedure of product development of claim 14 wherein the user interface presents the relationships to a user with a file format, which can be modified by the user directly.

* * * * *